US012444206B2

(12) United States Patent
Studer

(10) Patent No.: US 12,444,206 B2
(45) Date of Patent: Oct. 14, 2025

(54) METHOD FOR RECOGNISING OBJECTS WHICH ARE RELEVANT TO THE SAFETY OF A VEHICLE

(71) Applicant: MERCEDES-BENZ GROUP AG, Stuttgart (DE)

(72) Inventor: Stefan Studer, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 101 days.

(21) Appl. No.: 18/567,390

(22) PCT Filed: Apr. 20, 2022

(86) PCT No.: PCT/EP2022/060418
§ 371 (c)(1),
(2) Date: Dec. 6, 2023

(87) PCT Pub. No.: WO2022/258250
PCT Pub. Date: Dec. 15, 2022

(65) Prior Publication Data
US 2025/0104442 A1    Mar. 27, 2025

(30) Foreign Application Priority Data
Jun. 7, 2021   (DE) ............... 10 2021 002 918.6

(51) Int. Cl.
*G06V 20/58*   (2022.01)
*G01C 21/00*   (2006.01)
*G06V 20/59*   (2022.01)

(52) U.S. Cl.
CPC .......... *G06V 20/58* (2022.01); *G01C 21/3811* (2020.08); *G06V 20/59* (2022.01)

(58) Field of Classification Search
CPC ..... G06V 20/58; G06V 20/59; G01C 21/3811
See application file for complete search history.

(56) References Cited

U.S. PATENT DOCUMENTS 7,782,184 B2   8/2010   Wittorf et al.
8,384,534 B2   2/2013   James et al.
(Continued)

FOREIGN PATENT DOCUMENTS

DE   102006041857 A1   4/2007
DE   102016201939 A1   8/2017
(Continued)

OTHER PUBLICATIONS

International Search Report and Written Opinion mailed Jul. 20, 2022 in related/corresponding International Application No. PCT/EP2022/060418.
(Continued)

*Primary Examiner* — Hussein Elchanti
(74) *Attorney, Agent, or Firm* — PATENT PORTFOLIO BUILDERS PLLC

(57) ABSTRACT

A method involves classifying a respective object, which has been recognized by an object recognition device of the vehicle and initially classified as not relevant to the vehicle, as potentially relevant if it is recognized by a gaze recording device in the vehicle that a gaze of at least one vehicle occupant of the vehicle lingers on the respective object for longer than a predetermined minimum duration. Using a recorded gaze direction of the at least one vehicle occupant, it is determined that a respective moving object classified as potentially relevant is tracked by the at least one vehicle occupant for at least a predetermined duration. A trajectory of the respective recorded and moving object classified as potentially relevant to the vehicle is identified as being relevant to the safety of the vehicle after the predetermined duration has elapsed if it is necessary for the vehicle to react to the respective object.

14 Claims, 1 Drawing Sheet

(56) References Cited

U.S. PATENT DOCUMENTS

| | | | |
|---|---|---|---|
| 11,073,831 B2 | 7/2021 | Jiang et al. | |
| 11,223,775 B2 | 1/2022 | Gehrling et al. | |
| 2007/0102214 A1* | 5/2007 | Wittorf | G06V 20/58 |
| | | | 180/167 |
| 2018/0178811 A1* | 6/2018 | Ohta | G08G 1/167 |
| 2018/0323972 A1* | 11/2018 | Reed | H04W 12/068 |
| 2018/0339730 A1* | 11/2018 | Hovis | G06V 20/52 |
| 2018/0365533 A1* | 12/2018 | Sathyanarayana | G06F 18/24 |
| 2020/0139965 A1* | 5/2020 | Hanna | B60W 30/0956 |
| 2022/0203996 A1* | 6/2022 | Katz | B60W 50/14 |
| 2022/0277165 A1* | 9/2022 | Zhu | G06V 20/597 |
| 2024/0046612 A1* | 2/2024 | Panetta | G06T 7/0004 |

FOREIGN PATENT DOCUMENTS

| | | |
|---|---|---|
| DE | 102017207960 A1 | 11/2018 |
| DE | 102017221202 B3 | 12/2018 |
| DE | 102019004075 A1 | 1/2020 |
| DE | 102018219125 A1 | 5/2020 |
| EP | 3407257 A1 | 11/2018 |
| JP | 2005251111 A | 9/2005 |
| JP | 2006146429 A | 6/2006 |
| JP | 2006268678 A | 10/2006 |
| JP | 2013517575 A | 5/2013 |
| JP | 2020064611 A | 4/2020 |
| JP | 2020138696 A | 9/2020 |
| KR | 20200009986 A | 1/2020 |
| WO | 2020157135 A1 | 8/2020 |

OTHER PUBLICATIONS

Office Action created Oct. 8, 2021 in related/corresponding DE Application No. 10 2021 002 918.6.

Stapel et al.; "Measuring Driver Perception: Combining Eye-Tracking and Automated Road Scene Perception;" Human Factors; Sep. 29, 2020; vol. 64, No. 4; https://journals.sagepub.com/doi/pdf/10.1177/0018720820959958.

Office Action dated Jan. 21, 2025 in related/corresponding JP Application No. 2023-575509.

Office Action dated Jun. 17, 2025 in related/corresponding JP Application No. 2023-575509.

\* cited by examiner

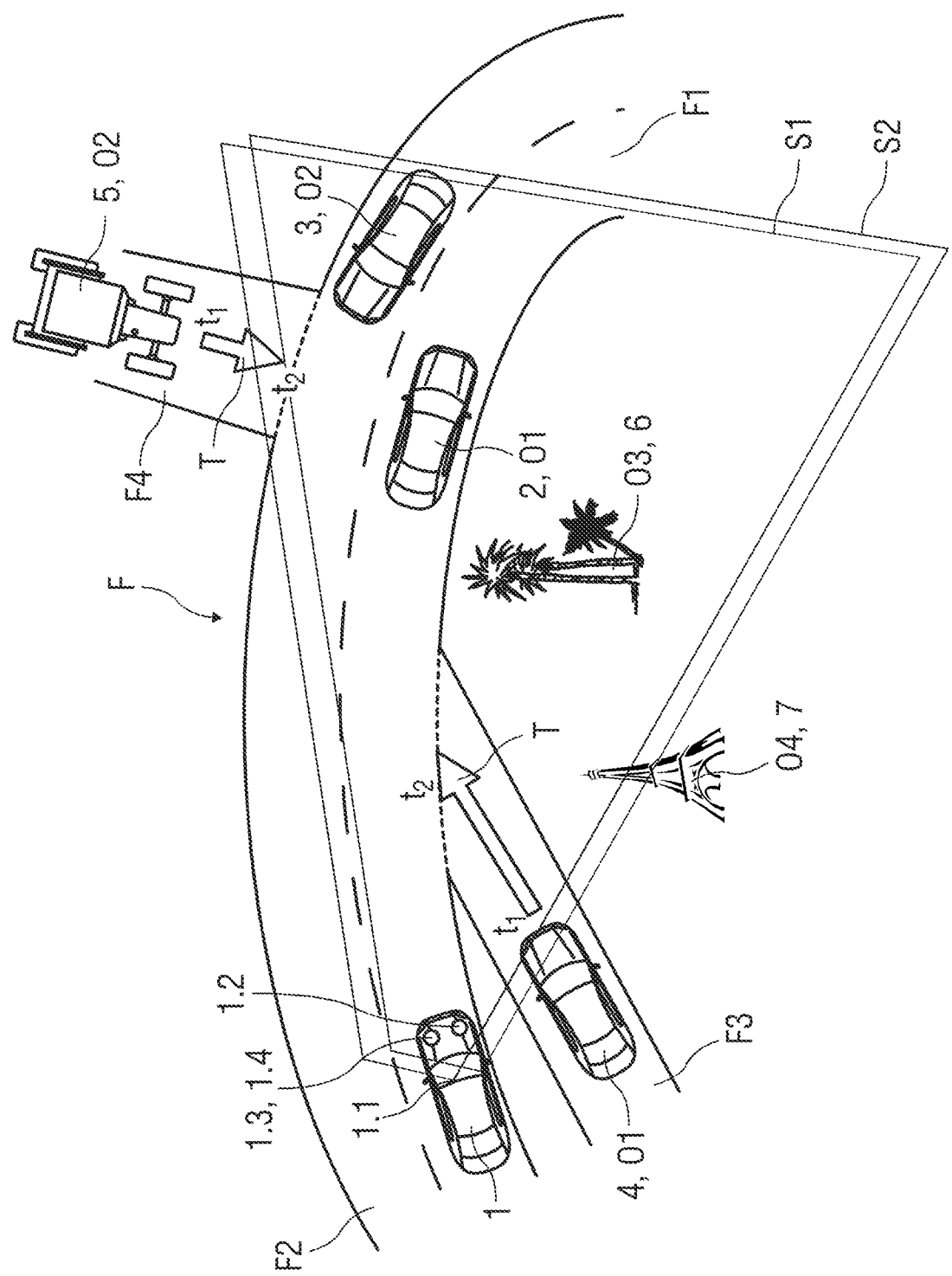

METHOD FOR RECOGNISING OBJECTS WHICH ARE RELEVANT TO THE SAFETY OF A VEHICLE

BACKGROUND AND SUMMARY OF THE INVENTION

Exemplary embodiments of the invention relate to a method for recognizing objects relevant to the safety of a vehicle in an environment of the vehicle, wherein the environment and objects located in the latter are detected using recorded signals of an environment sensor of the vehicle.

A method for determining a relevance of an object in an environment of a motor vehicle to the motor vehicle by means of a driver assistance system of the motor vehicle and such a driver assistance system are known from DE 10 2019 004 075 A1. The method provides that the object in the environment of the motor vehicle that has been recorded with a recording device of the driver assistance system is compared by means of an electronic computer of the driver assistance system with an object stored in a storage device of the driver assistance system, and the object is characterized by means of the electronic computer depending on the comparison. A gaze direction of a driver of the motor vehicle is recorded by means of a gaze direction recording device of the driver assistance system, and the relevance for the characterized object is determined depending on the recorded gaze direction.

Exemplary embodiments of the invention are directed to a method for recognizing objects which are relevant to the safety of a vehicle.

A method for recognizing objects relevant to the safety of a vehicle, in particular traffic routing, landmarks and places of interest, in an environment of the vehicle, provides that the environment and objects located in the latter are detected using recorded signals of an environment sensor of the vehicle. According to the invention, a respective object, which has been recognized by means of an object recognition device of the vehicle and initially classified as not relevant to the vehicle, is classified as potentially relevant if it is recognized by means of a gaze recording device in the vehicle that a gaze of at least one vehicle occupant of the vehicle, in particular of all of the vehicle occupants of the vehicle, lingers on the respective object for longer than a pre-determined minimum gaze duration. In addition, it is determined using a recorded gaze direction of the at least one vehicle occupant, in particular of all of the vehicle occupants, that a respective moving object that has been classified as potentially relevant is tracked by the at least one vehicle occupant, in particular by all of the vehicle occupants, for at least a pre-determined duration, wherein a trajectory of the respective recorded, moving object classified as potentially relevant is identified as being potentially relevant to the safety of the vehicle after the pre-determined duration has elapsed if it is necessary for the vehicle to react to the respective object, for example by means of a steering movement and/or a braking or acceleration by the driver or by a driver assistance system.

By using the method, safety can be increased by taking into account objects on trajectories that are relevant to safety, in particular in relation to a function of a driver assistance system. The relevance of the respective object depends on a driving task of the vehicle.

With this method, objects can be easily identified as relevant to the safety of the vehicle using identified trajectories that are relevant to safety. In particular, objects are recognized as relevant to safety if they are located on trajectories that have been identified as relevant to safety at an earlier point in time.

In an embodiment of the method, the respective trajectory of a moving object that has been identified as relevant to safety is stored as traffic routing that is relevant to safety in a digital map of the vehicle and/or in a computer unit coupled with the vehicle via data technology. For this purpose, such information is also aggregated in the digital map over a comparatively large number of journeys, in that if an object is categorized as relevant to safety, the trajectory is noted, e.g., marked, with location information in the digital map. A relevance of the traffic routing is thus confirmed multiple times before it is stored as such in the digital map, before the traffic routing is stored as relevant to safety in the digital map.

In a development of the method, the digital map stored in the vehicle and/or in the computer unit is made available to further vehicles. Trajectories are made available to the vehicle assistance system, such that objects on these trajectories can in future be considered relevant to a driving task of the vehicle and of the further vehicles.

For this purpose, in a further embodiment, an object recorded at a later point in time is classified as relevant to depending on its presence on one of the stored traffic routings that are relevant to safety. If the object recorded later is located on a trajectory previously determined to be relevant to safety, this object represents a moving object which is relevant to the safety of the vehicle.

A possible embodiment of the method further provides that, in order to recognize landmarks and/or places of interest, a respective stationary object is classified as potentially relevant by means of a model, wherein the respective stationary object that has been classified as potentially relevant is displayed to at least one vehicle occupant, who categorizes the respective stationary object that has been classified as potentially relevant as a landmark and/or as a place of interest. It is thus provided that a distinction is made between landmarks and places of interest, wherein the landmarks serve for navigation and a driving experience can be improve by means of places of interest.

In addition, in a development of the method, the stationary object that is classified as potentially relevant is stored in the digital map as a landmark and/or as a place of interest. The respective landmark and/or the respective place of interest are thus displayed in the vehicle and can serve for navigation, for example during a rally drive, and to improve the driving experience, for example by stopping at the place of interest.

BRIEF DESCRIPTION OF THE DRAWING FIGURE

Exemplary embodiments of the invention are explained in more detail in the following with reference to a drawing. Here:

The sole FIGURE schematically shows a road portion having two opposite lanes and a vehicle driving in a right lane.

DETAILED DESCRIPTION

The sole FIGURE shows a road portion F having two opposite lanes F1, F2. A vehicle 1 is driving in a right lane F1, ahead of which vehicle a first vehicle 2 is driving and towards which vehicle a second vehicle 3 is driving in a left lane F2.

On a route portion of the road portion F directly ahead of the vehicle 1, a slip road F3 leads into the right lane F1, whereby a third vehicle 4 as a first object O1 intends to drive into the right lane F1. A dirt road F4 leads away from the left lane F2, on which a tractor 5 is driving as a second object O2 in the direction of the left lane F2.

Next to the right lane F1 there are two further objects O3, O4, with a third object O3 being a palm tree 6 and a fourth object O4 being an observation tower 7.

The vehicle 1 has an environment sensor 1.1, which comprises a number of recording units (not depicted in more detail), which are arranged in and/or on the vehicle 1. For example, the recording units are designed as lidar-based, radar-based, ultrasound-based sensors and/or as multi-functional cameras.

The environment sensor 1.1 has a field of vision S1, wherein a further field of vision S2 of vehicle occupants of the vehicle 1 almost corresponds to the field of vision S1 of the environment sensor 1.1 or a subset of the latter. In particular, two vehicle occupants are located in the vehicle 1.

Using recorded signals of the environment sensor 1.1, an environment of the vehicle 1 and objects O1 to O4 located in the latter are detected, wherein a plurality of objects O1 to O4 is recognized by means of an object recognition device 1.2 of the vehicle 1.

The danger can arise that the relevance of the individual recognized objects O1 to O4 for the vehicle 1 cannot or can only be insufficiently evaluated without contextual information on the individual recognized objects. The relevance relates both to a driving task and to objects O3, O4 for navigation and/or as places of interest.

A method described in the following is provided to determine the relevance of the respective object O1 to O4 for the vehicle 1.

According to the method, all recognized objects O1 to O4 are selected, which are classified by a driver assistance system (not depicted in more detail) of the vehicle 1 as not relevant to a driving task. These objects O1 to O4 are initially classified as potentially relevant.

The driver assistance system comprises a satellite-supported position determining unit, navigation data, the environment sensor 1.1, the object recognition device 1.2, and an interior camera 1.3 having a gaze recording device 1.4. The driver assistance system usually selects objects O1 to O4 and discards others, for example to reduce a computing time. In a possible embodiment, it can be a driver assistance system for the automated, e.g., for the highly automated, driving operation of the vehicle 1.

In particular, these objects O1 to O4 are classified as potentially relevant if it is recognized by means of a gaze recording device 1.4 in the vehicle that at a point in time $t_1$ of a pre-determined duration, a gaze of the vehicle occupant of the vehicle 1 lingers on the respective object O1 to O4 for longer than a pre-determined minimum gaze duration. A requirement for the aforementioned is that the field of vision S1 of the environment sensor 1.1 corresponds substantially to the further field of vision S2 of the vehicle occupant.

In relation to recognition of traffic routing relevant to the safety of the vehicle 1, it is provided that, when moving objects O1, O2 are recognized, it is observed whether the respective object O1, O2 becomes relevant to the driving task of the vehicle 1 due to the movement of the object and a movement of the vehicle 1, and thus in a further route. For example, the tractor 5 as a second object O2 can drive from the dirt road F4 onto the road portion F and become relevant to the safety of the vehicle 1 at a further point in time $t_2$ when the pre-determined duration elapses.

The third vehicle 4 as a moving first object O1 on the slip road F3 can also be relevant to the vehicle 1 at a further point in time $t_2$. In particular, a trajectory T of the respective recorded, moving object O1, O2 that has been classified as potentially relevant to the vehicle 1 is identified as relevant to the safety of the vehicle 1 after the pre-determined duration has elapsed if it is necessary, due to the trajectory T of the third vehicle 4 and/or of the tractor 5, for the vehicle 1 to react to the respective object O1, O2, for example by means of a steering movement and/or a braking or acceleration by the driver or by a driver assistance system.

The trajectories T of the moving objects O1, O2 that have been identified as relevant to safety are stored in a digital map as traffic routing that is relevant to safety after their relevance for the driving task has been confirmed multiple times, for example by further vehicles of a vehicle fleet (not shown in more detail) to which the vehicle 1 belongs.

This digital map is stored in the vehicle 1 and/or deposited in a computer unit (not depicted in more detail) coupled with the vehicle 1 via data technology. For example, the digital map with the stored traffic routings that are relevant to safety can be made available to further vehicles via the vehicle 1 and/or via the computing unit. For example, it is made available, in particular, if the respective further vehicle is located on the corresponding road portion F. In particular, the traffic routing which is relevant to safety is made available to the driver assistance system.

In relation to the recognition of landmarks and/or places of interest, the method provides that by means of a stored model, in particular a machine learning model, the respective object O3, O4 recognized by means of the object recognition device 1.2 is classified as a stationary object O3, O4 in the form of a palm tree 6 and an observation tower 7.

The respective object O3, O4 is then shown to the vehicle occupant of the vehicle 1, in particular on a display unit, for example in the region of an instrument panel. The vehicle occupant or the vehicle occupants now have the possibility of categorizing the respective object O3, O4 as a landmark and/or as a place of interest. For example, a question is shown on the display unit for this purpose. Such a landmark is in particular relevant to navigation of the vehicle 1, e.g., for a rally drive, in which navigation is performed by means of landmarks.

Here too it is provided that the landmarks and places of interest are stored in the digital map, and are thus available to the vehicle 1, and optionally to further vehicles, at least of the same vehicle fleet.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the FIGURE enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the inven-

The invention claimed is:

1. A method comprising:
   detecting, using an environmental sensor of a vehicle, an environment and objects located in the environment;
   classifying a respective object, which has been recognized by an object recognition device of the vehicle and initially classified as not relevant to the vehicle, as potentially relevant if it is recognized by a gaze recording device in the vehicle that a gaze of at least one vehicle occupant of the vehicle lingers on the respective object for longer than a predetermined minimum gaze duration, wherein the respective object includes a respective moving object;
   determining, using a recorded gaze direction of the at least one vehicle occupant, that the respective moving object classified as potentially relevant is tracked by the at least one vehicle occupant for at least a predetermined duration;
   identifying a trajectory of the respective recorded and moving object classified as potentially relevant to the vehicle as being relevant to the safety of the vehicle after the predetermined duration has elapsed if it is necessary for the vehicle to react to the respective object;
   storing the respective trajectory of a moving object identified as relevant to safety as traffic routing relevant to safety in a digital map of the vehicle; and
   autonomously operating the vehicle along a trajectory based on the respective trajectory of a moving object identified as relevant to safety as traffic routing relevant to safety stored in the digital map of the vehicle.

2. The method of claim 1, wherein a further object recorded at a later point in time is classified as relevant to the safety of the vehicle depending on the further object's presence on one of the stored traffic routings that are relevant to safety.

3. The method of claim 1, wherein the respective trajectory of a moving object identified as relevant to safety is stored as traffic routing relevant to safety in a digital map of the vehicle.

4. The method of claim 3, wherein the digital map stored in the vehicle.

5. The method of claim 3, wherein a further object recorded at a later point in time is classified as relevant to the safety of the vehicle depending on the further object's presence on one of the stored traffic routings that are relevant to safety.

6. The method of claim 3, wherein, to recognize landmarks or places of interest, a respective stationary object is classified as potentially relevant by a model, wherein the respective stationary object classified as potentially relevant is displayed to at least one vehicle occupant, wherein the at least one vehicle occupant categorizes the respective stationary object classified as potentially relevant as a landmark or as a place of interest, wherein the respective object includes the respective stationary object.

7. The method of claim 6, wherein the stationary object classified as potentially relevant is stored in the digital map as a landmark or as a place of interest.

8. A method comprising:
   detecting, using an environmental sensor of a vehicle, an environment and objects located in the environment;
   classifying a respective object, which has been recognized by an object recognition device of the vehicle and initially classified as not relevant to the vehicle, as potentially relevant if it is recognized by a gaze recording device in the vehicle that a gaze of at least one vehicle occupant of the vehicle lingers on the respective object for longer than a predetermined minimum gaze duration, wherein the respective object includes a respective moving object;
   determining, using a recorded gaze direction of the at least one vehicle occupant, that the respective moving object classified as potentially relevant is tracked by the at least one vehicle occupant for at least a predetermined duration;
   identifying a trajectory of the respective recorded and moving object classified as potentially relevant to the vehicle as being relevant to the safety of the vehicle after the predetermined duration has elapsed if it is necessary for the vehicle to react to the respective object;
   storing the respective trajectory of a moving object identified as relevant to safety as traffic routing relevant to safety in a digital map of the vehicle;
   providing, by the vehicle to a further vehicle, the digital map; and
   autonomously operating the further vehicle along a trajectory based on the respective trajectory of a moving object identified as relevant to safety as traffic routing relevant to safety in the digital map of the further vehicle.

9. The method of claim 8, wherein a further object recorded at a later point in time is classified as relevant to the safety of the vehicle depending on the further object's presence on one of the stored traffic routings that are relevant to safety.

10. The method of claim 8, wherein the respective trajectory of a moving object identified as relevant to safety is stored as traffic routing relevant to safety in a digital map of the vehicle.

11. The method of claim 10, wherein the digital map stored in the vehicle.

12. The method of claim 10, wherein a further object recorded at a later point in time is classified as relevant to the safety of the vehicle depending on the further object's presence on one of the stored traffic routings that are relevant to safety.

13. The method of claim 10, wherein, to recognize landmarks or places of interest, a respective stationary object is classified as potentially relevant by a model, wherein the respective stationary object classified as potentially relevant is displayed to at least one vehicle occupant, wherein the at least one vehicle occupant categorizes the respective stationary object classified as potentially relevant as a landmark or as a place of interest, wherein the respective object includes the respective stationary object.

14. The method of claim 13, wherein the stationary object classified as potentially relevant is stored in the digital map of the vehicle as a landmark or as a place of interest.

* * * * *